United States Patent
Murakami

(10) Patent No.: US 6,702,717 B2
(45) Date of Patent: Mar. 9, 2004

(54) VEHICLE-BEHAVIOR CONTROL APPARATUS AND METHOD

(75) Inventor: Zensaku Murakami, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/336,011

(22) Filed: Jan. 3, 2003

(65) Prior Publication Data

US 2003/0102713 A1 Jun. 5, 2003

Related U.S. Application Data

(63) Continuation of application No. 09/579,063, filed on May 26, 2000.

(30) Foreign Application Priority Data

Jun. 8, 1999 (JP) .............................. 11-160889

(51) Int. Cl.⁷ ............................ B60K 41/20; B60T 8/24
(52) U.S. Cl. ......................................... 477/182; 701/81
(58) Field of Search ........................ 477/182; 192/219; 303/139, DIG. 6; 701/71, 72, 78, 81

(56) References Cited

U.S. PATENT DOCUMENTS

| | | | |
|---|---|---|---|
| 4,761,043 A | 8/1988 | Wupper et al. | |
| 4,762,376 A | 8/1988 | Matsubara | |
| 4,792,193 A | 12/1988 | Takahashi et al. | |
| 4,962,970 A | 10/1990 | Jonner et al. | |
| 5,093,790 A | 3/1992 | Shiraishi et al. | |
| 5,105,903 A | 4/1992 | Buschmann | |
| 5,125,490 A | 6/1992 | Suzumura et al. | |
| 5,249,849 A | 10/1993 | Sakata | |
| 5,282,138 A | 1/1994 | Sano | |
| 5,470,135 A | 11/1995 | Shitani et al. | |
| 5,688,202 A | 11/1997 | Bowen | |
| 5,702,165 A | 12/1997 | Koibuchi | |
| 5,797,664 A | * 8/1998 | Tagawa .................... 701/81 X |
| 5,897,601 A | 4/1999 | Suzuki | |
| 5,941,613 A | 8/1999 | Tagawa | |
| 6,007,454 A | 12/1999 | Takahira et al. | |
| 6,035,251 A | 3/2000 | Hac et al. | |
| 6,122,584 A | 9/2000 | Lin et al. | |
| 6,189,643 B1 | 2/2001 | Takahashi et al. | |
| 6,195,606 B1 | 2/2001 | Barta et al. | |
| 6,208,929 B1 | 3/2001 | Matsuno et al. | |
| 6,216,081 B1 | 4/2001 | Tabata et al. | |
| 6,219,609 B1 | * 4/2001 | Matsuno et al. .......... 701/72 X |
| 6,273,529 B1 | 8/2001 | Woywod et al. | |
| 6,278,930 B1 | 8/2001 | Yamada et al. | |
| 6,305,760 B1 | 10/2001 | Otake | |
| 6,308,126 B2 | 10/2001 | Yokoyama et al. | |

FOREIGN PATENT DOCUMENTS

| | | |
|---|---|---|
| DE | 197 30 746 | 1/1998 |
| EP | 0 260 451 | 8/1987 |
| EP | 0 463 777 A2 | 6/1991 |
| GB | 2 323 940 | 10/1998 |
| JP | 5338459 | 12/1993 |
| JP | 8-91195 | 4/1996 |
| JP | A 8-310366 | 11/1996 |
| JP | 9-20217 | 1/1997 |
| JP | 9-136637 | 5/1997 |
| JP | 9-249109 | 9/1997 |
| JP | 10-81217 | 3/1998 |
| JP | 11-15719 | 4/1999 |

OTHER PUBLICATIONS

Disclosed Anonymously, "All Wheel Drive Traction Control System", Apr. 1991, p. 223.

* cited by examiner

*Primary Examiner*—Roger Pang
(74) *Attorney, Agent, or Firm*—Oliff & Berridge, PLC

(57) ABSTRACT

A vehicle-behavior control apparatus for a vehicle with a center differential comprising of a control unit adopted to be connected to a braking system and vehicle status sensors. This control unit directs the braking system to distribute suitable braking force to each wheels in response to a spin or driftout moment determined by any outputs of the vehicle sensors and a state of the center differential determined by a differential state sensor.

9 Claims, 10 Drawing Sheets

VEHICLE-BEHAVIOR CONTROL APPARATUS AND METHOD

This is a Continuation of application Ser. No. 09/579,063 filed May 26, 2000. The entire disclosure of the prior application(s) is hereby incorporated by reference herein in its entirety.

BACKGROUND OF THE INVENTION

1. Field of the Invention

The present invention relates to a vehicle-behavior control apparatus and method for stabilizing a turning behavior of a vehicle and, more particularly, to a vehicle-behavior control apparatus and method for controlling a turning behavior of a vehicle provided with a differential gear mechanism.

2. Related Background Art

There are conventionally known vehicle-behavior control systems for controlling the turning behavior of the vehicle. For example, Japanese Patent Application Laid-Open No. 8-310366 discloses such technology that, under conditions in which the vehicle is transferring into a spin tendency or into a drift-out tendency, braking force at each wheel is adjusted according to each of behavioral states so as to restrain this transfer.

SUMMARY OF THE INVENTION

For example, in the case of vehicles equipped with a center differential for transmitting the driving force of the engine to a front-wheel drive shaft and a rear-wheel drive shaft with permitting a difference in rotation between them, once the differential mechanism of the center differential is locked by driver's manipulation, wheel rotation speeds of the front and rear wheels will suffer restriction from each other, and in this state the sum of wheel rotation speeds of the front left and right wheels will always agree with the sum of wheel rotation speeds of the rear left and right wheels. Supposing the braking force is exerted on the front outside wheel to decrease the wheel speed thereof to some extent, either of the following effects will appear by the degree of the decrease in the rotation speed of the front outside wheel: (a) the front inside wheel increases its speed; (b) the rear inside wheel decreases its speed; or (c) both of the rear wheels decrease their speed. In the case of the front-wheel-drive vehicles or the front-wheel-drive-based four-wheel-drive vehicles, processing for estimating the vehicle speed is carried out based on the wheel speed of the front inside wheel. Therefore, the estimated vehicle speed becomes higher in the case of (a). This causes a target speed of the front outside wheel to be set higher, thereby resulting in weakening the braking force at this wheel. If the rear inside wheel is retarded to undergo braking as in (b), a moment to promote the spin tendency will act to the body. If braking is also effected further at the rear outside wheel as in (c), lateral forces on the rear wheels will decrease, so as to affect stability of vehicle behavior.

Therefore, if the same turning behavior control is carried out when applying the braking force to the outside wheels regardless of locking or unlocking of the center differential, the effect of the turning behavior control of vehicle will not be exhibited fully in certain cases, because an antispin moment, a front-rear balance between wheels lateral forces, etc. depending on locking or unlocking of the center differential.

The above illustrated description is concerning about the center differential as a differential gear mechanism, the same goes for a front differential disposed on the front axle or a rear differential disposed on the rear axle.

The present invention has been accomplished in order to solve the above problem and an object of the invention is to provide a vehicle-behavior control apparatus capable of carrying out suitable turning behavior control according to lock status of the differential mechanism.

A vehicle-behavior control apparatus according to the present invention comprises of braking mechanisms provided for the respective wheels and applying a braking force to a corresponding wheel, and a braking force control means for controlling the braking force applied by each of the braking mechanisms in accordance with a behavior state of the vehicle. Wherein the braking force control means changes the braking force applied by each of the braking mechanisms, depending on whether or not the differential mechanism is in a differential limited state to block differential action thereof.

The vehicle-behavior control apparatus according to the present invention may have a control unit adopted to be connected to a braking system and vehicle status sensors. This control unit directs the braking system to distribute suitable braking force to each wheels in response to a spin or driftout moment determined by any outputs of the vehicle sensors and a state of the center differential determined by a differential state sensor.

A vehicle-behavior control method according to the present invention comprises of (1) estimating a spin and driftout moment and a lock state of the center differential and (2) controlling braking force distributions in response to this estimating result.

Since the control unit (braking force control means) changes the braking forces applied to the wheels by the braking mechanisms in consideration of the differential limited state of the center differential (differential mechanism), the suitable turning behavior control can be carried out, taking the differential limited state of the differential mechanism into consideration.

The differential mechanism may be a center differential for distributing the driving force to the front wheels and to the rear wheels. In the differential limited state of the center differential, the wheel rotation speeds of the front and rear wheels suffer restriction from each other and the braking force and/or the driving force acts to unexpected wheels. This can result in change in the magnitude of the antispin moment generated and in the front-rear balance between tire lateral forces, when compared with those in the free state of the center differential. Preferably the braking force control means thus sets the braking force generated at each braking mechanisms in consideration of such conditions.

The braking force control means may apply an excess braking force to the front outside wheel, whereby the antispin moment is exerted on the vehicle to restrain the spin tendency of vehicle behavior, thereby stabilizing the behavior of the vehicle.

If the braking force control of each braking means is carried out in order to stabilize the turning behavior of the vehicle in the differential limited state of the differential mechanism, there will also arise such cases that the effect of the behavior control is not demonstrated fully. Therefore, the braking force control by the braking force control means is preferably disabled when the differential mechanism is in the differential limited state.

In the differential limited state of the differential mechanism, the braking force at the front wheels (particularly, at the front outside wheel) acts as circulating torque to the rear wheels. When the road friction force is large, the vertical load decreases greatly, particularly, at the rear inside wheel because of a load shift due to the centrifugal force. This raises the possibility of increasing slip amounts. For this reason, the braking force control by the braking force control means is preferably disabled when the differential mechanism is in the differential limited state and when the road friction force is large.

Since the stability of the vehicle becomes lower with increase in the vehicle speed, the apparatus may be constructed so that the braking force control by the braking force control means is carried out with priority during running at high speed even in the differential limited state of the differential mechanism in order to stabilize the vehicle behavior, whereas the braking force control by the braking force control means is disabled in the low speed range of vehicle speed.

When the traction is suppressed, the vehicle speed is decreased, which acts advantageously in terms of running stability. For this reason, it is preferable to suppress the traction by traction suppressing means even if the braking force control by the braking force control means is disabled under either of the aforementioned conditions in the differential limited state of the differential mechanism.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 to FIG. 4 are graphs to show the relationship among forces acting to the wheels, wherein FIG. 2 is a graph to show the relationship in the case of an oversteer tendency, FIG. 3 a graph to show the relationship in the case of an understeer tendency, and FIG. 4 a graph to show the relationship in the case of an oversteer tendency in a vehicle with at least the front-wheel-driven;

DESCRIPTION OF THE PREFERRED EMBODIMENTS

Prior to the description of the embodiments, let us discuss distribution techniques for distributing the braking force to the left and right wheels and to the front and rear wheels, employed in the present embodiment.

Figure 1:
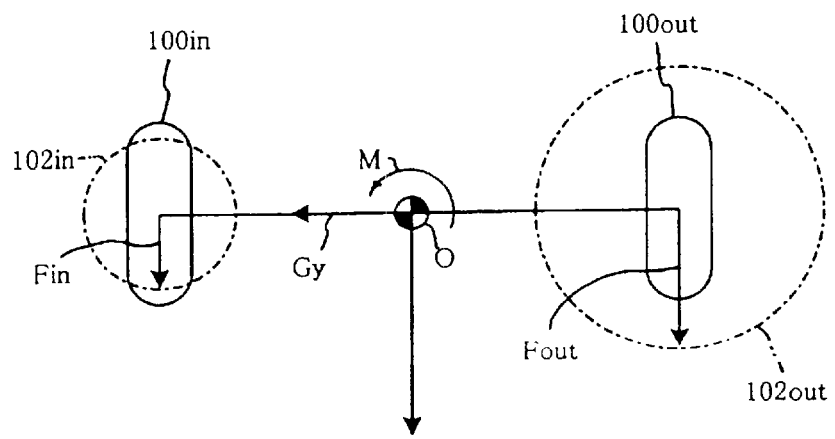
FIG. 1 is a diagram of right-and-left two wheels model to explain forces acting to the wheels when the vehicle turns left.

First, a distribution technique to the left and right wheels will be explained. As illustrated in FIG. 1, let us assume a state in which a vehicle model with right-and-left two wheels having the wheel base of 0 is in a left turn at lateral acceleration Gy. It is noted that a friction circle 102$out$ of the outside wheel 100$out$ is greater than a friction circle 102$in$ of the inside wheel 100$in$ because of the load shift. Particularly, letting m be the weight of the vehicle, g be the gravity, h be the height of the gravity center 0 of the vehicle, and t be the tread, the radius Finmax of the friction circle of the inside wheel and the radius Foutmax of the friction circle of the outside wheel can be expressed by Eq. (1) and Eq. (2) below, respectively.

$$Finmax = m \times \frac{g}{2} - m \times Gy \times \frac{h}{t} \quad (1)$$

$$Foutmax = m \times \frac{g}{2} + m \times Gy \times \frac{h}{t} \quad (2)$$

Figure 2:
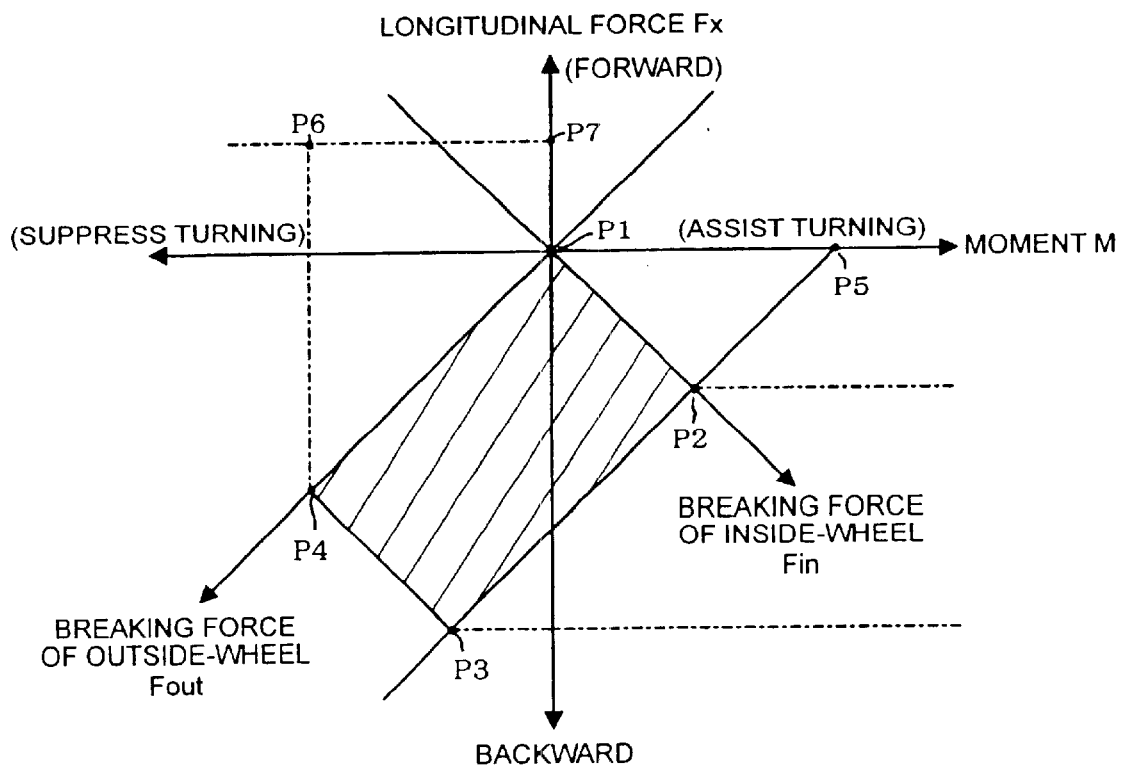

Therefore, with the moment M on the horizontal axis and the longitudinal force Fx on the vertical axis, as illustrated in FIG. 2, the yaw moment and longitudinal force acting to the vehicle because of action of braking force fall in a hatched rectangular area (controllable range) as shown in FIG. 2. When a target yaw moment Mt and a target longitudinal force Fx are within this controllable range, two perpendiculars are drawn to each of the axis of the inside-wheel braking force and the axis of the outside-wheel braking force from a coordinate point determined by the target yaw moment Mt and the target longitudinal force Fx with reference to the axis of the yaw moment and the axis of the longitudinal force, and each of a target braking force for the inside wheel and a target braking force for the outside wheel can be obtained uniquely as a value of a coordinate point of the foot of the corresponding perpendicular.

In contrast with it, we have to define how to determine the target braking forces for the inside and the outside wheels when the target yaw moment Mt and target longitudinal force Fx are beyond the above-stated controllable range. Generally speaking, when the behavior of the vehicle is the oversteer tendency (spin tendency), it is effective to apply the antispin moment to the vehicle in order to stabilize the behavior of the vehicle. Therefore, the distribution of braking force to the left and right wheels is determined with priority to attainment of the target yaw moment Mt in the present embodiment.

Specifically, when the target yaw moment Mt and target longitudinal force Fx are present in an area defined by points P1, P4, P6, and P7 (which will be called hereinafter "spin area") as illustrated in FIG. 2, a point having coordinates of the target yaw moment and the target longitudinal force is moved in parallel to the axis of longitudinal force onto the axis of outside-wheel braking force and coordinates of a resultant point on the outside-wheel braking force axis after the movement are set as a target braking force (=0) for the inside wheel and a target braking force for the outside wheel.

When the behavior of the vehicle is the understeer tendency (drift-out tendency), it is generally effective to retard the vehicle (so as to cause a load shift, to generate a moment in a direction to assist turning, and a decrease in the vehicle speed due to the deceleration) in order to stabilize the behavior of the vehicle. Therefore, the distribution of braking force to the left and right wheels is determined with priority to attainment of the target longitudinal force in the present embodiment.

Specifically, when the target yaw moment and the target longitudinal force are within an area between a straight line parallel to the axis of moment M through the point P2 and a straight line parallel to the axis of moment M through the point P3 and below a straight line connecting the point P5 and the point P3 (this area will be referred to as "drift-out area"), a point having coordinates of the target yaw moment and the target longitudinal force is moved in parallel to the axis of moment onto a line segment P2-P3 and coordinates of a resultant point on that line segment after the movement are set as target braking forces for the inside wheel and for the outside wheel.

In the embodiment described hereinafter, when the target yaw moment Mt and the target longitudinal force Fx are calculated as values in areas other than the aforementioned controllable range, spin area, and drift-out area, the target braking forces are set as those corresponding to a point on the boundary line of the controllable range, substantially closest to coordinates of the calculated values.

For example, when the target yaw moment and the target longitudinal force are within an area below a straight line connecting the point P6 and the point P7, above the axis of outside-wheel braking force, and on the left side of the line segment P6-P4, the target braking forces for the inside wheel and for the outside wheel are set to the coordinates of the point P4. When the target yaw moment and the target longitudinal force are within an area below the axis of outside-wheel braking force, above the straight line connecting the points P5 and P3, and below a straight line connecting the point P3 and point P4, a point having coordinates of the target yaw moment and the target longitudinal force is moved in parallel to the axis of outside-wheel braking force onto the line segment P3-P4 and coordinates of a resultant point on the line segment after the movement are set as target braking forces for the inside wheel and for the outside wheel.

When the target yaw moment and the target longitudinal force are within a triangular area defined by the points P1, P2, and P5, a point having the coordinates thereof is moved in parallel to the axis of outside-wheel braking force onto the axis of inside-wheel braking force and coordinates of a resultant point on the inside-wheel braking force axis after the movement are set as a target braking force for the inside wheel and a target braking force (=0) for the outside wheel. When the target yaw moment and the target longitudinal force are within an area above the straight line parallel to the axis of moment through the point P2 and below the straight line connecting the point P5 and point P3, the coordinates of the point P2 are set as target braking forces for the inside wheel and for the outside wheel. When the target yaw moment and the target longitudinal force are within an area below the straight line parallel to the axis of moment through the point P3 and below the straight line connecting the point P5 and point P3, the coordinates of the point P3 are set as target braking forces for the inside wheel and for the outside wheel.

Figure 3:
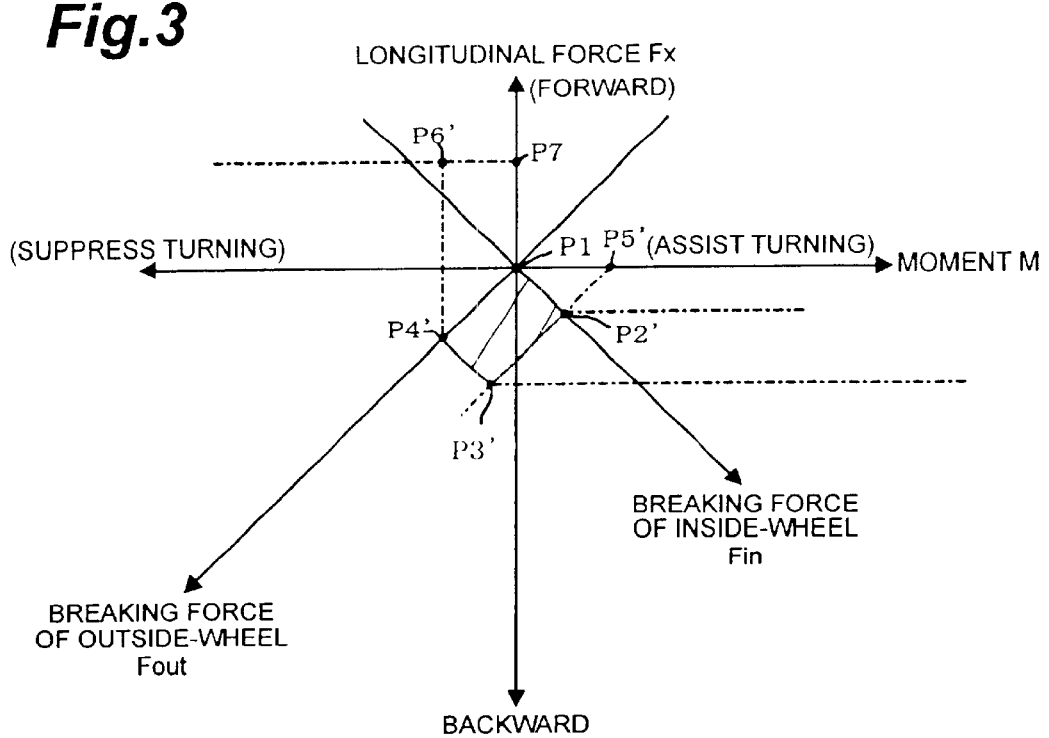

In the control of the oversteer state of the vehicle, however, an issue is decrease in lateral force due to application of braking force. Therefore, for example as illustrated in FIG. 3, the braking forces for the inside wheel and for the outside wheel are preferably set to ⅓ or less of the radius of the friction circle of the corresponding wheel. When the braking force is ⅓ or so of the radius of the friction circle, the decrease in lateral force can be controlled at 5% or so.

Figure 4:
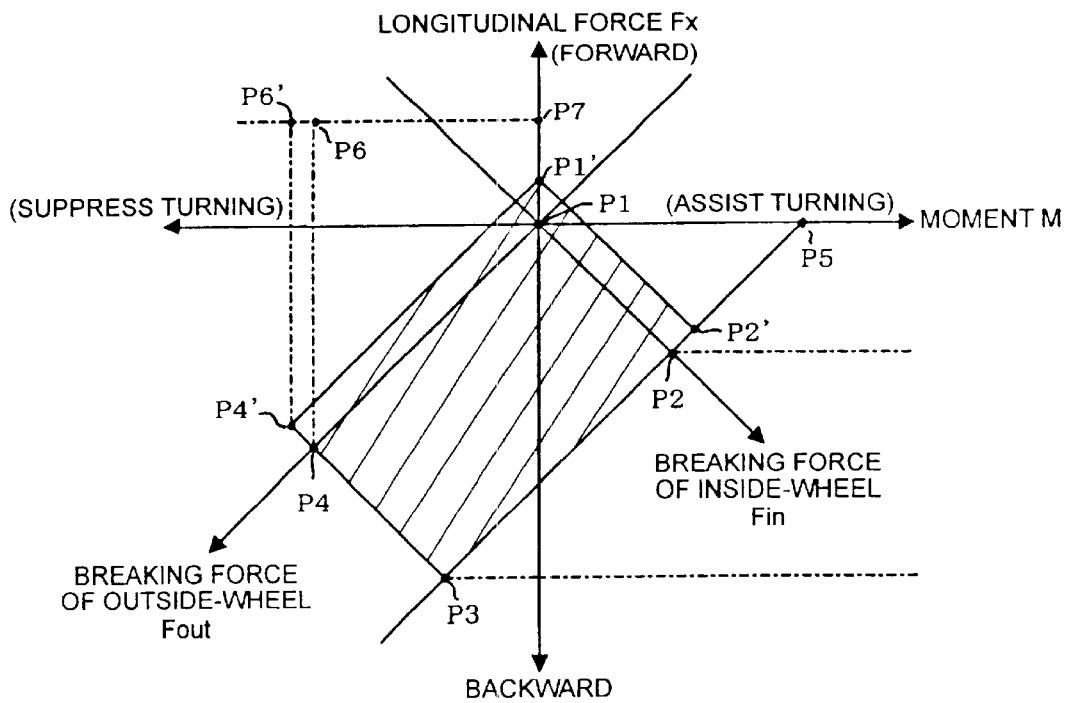

In the cases wherein the driving force is supplied to at least the front wheels, such as the four-wheel-drive vehicles, the front-wheel-drive vehicles, and the like, the yaw moment and longitudinal force that can be applied to the vehicle within the hatched area as shown in FIG. 4, and thus the controllable range is greater than that in the case of the control based on only the braking force. Only the braking force is controlled against the vehicle behavior of the understeer tendency, whereas the traction at the wheels is used additionally against the vehicle behavior of the oversteer tendency, thereby making it possible to apply a greater antispin moment to the vehicle and decrease the deceleration of the vehicle.

Figure 5:
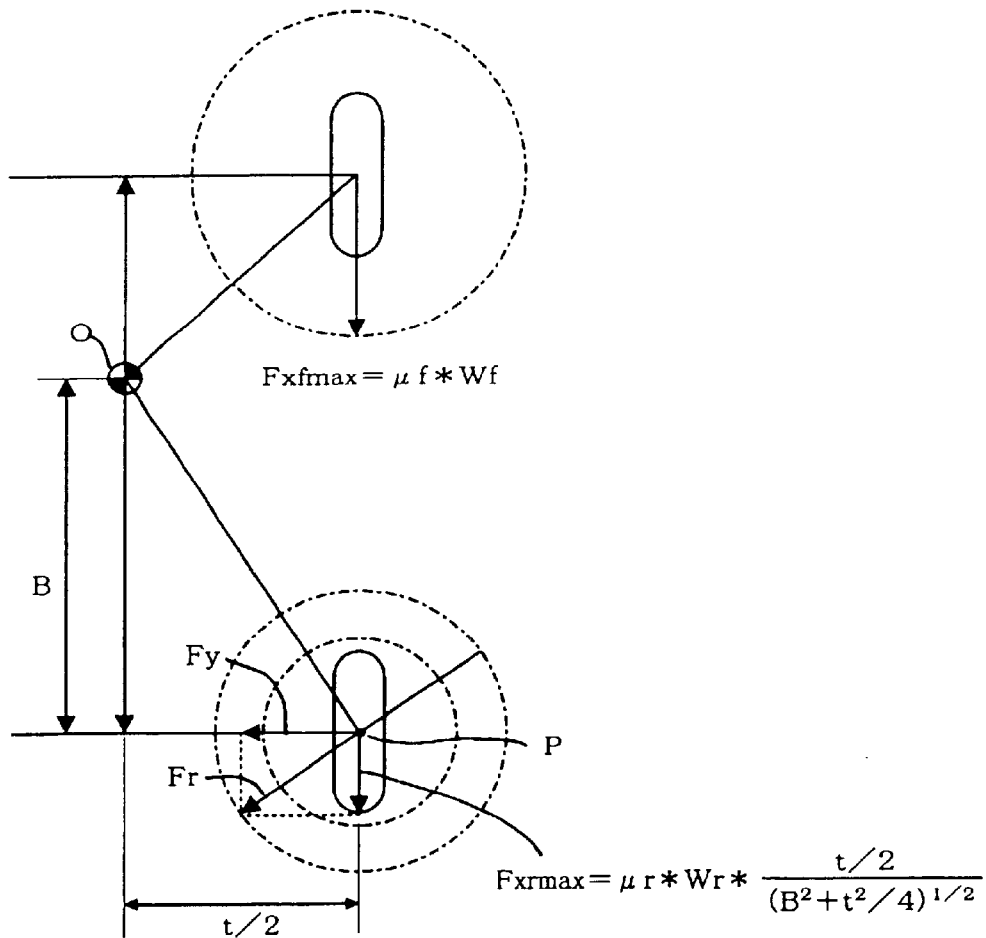
FIG. 5 is a diagram to explain how to distribute the braking force to the front and rear wheels during oversteer.

Next, a distribution technique of braking force to the front and rear wheels will be described. In the behavior control against the oversteer tendency, the antispin moment given to the vehicle becomes greater with increase in the braking force at the front outside wheel. The maximum longitudinal force (braking force) at the front wheel Fxfmax is given by the radius of the friction circle of the wheel, as illustrated in FIG. 5. Letting $\mu f$ be a coefficient of friction between the front wheel and the road surface and Wf be the load on the front wheel, Fxfmax can be expressed by Eq. (3) below.

$$Fxfmax = \mu f \times Wf \qquad (3)$$

For applying the braking force to the rear wheel, it is necessary to determine the braking force in consideration of both a moment given by the braking force and a moment decreased by reduction of lateral force. In other words, as illustrated in FIG. 5, the maximum braking force at the rear wheel Fxrmax to be determined so that the acting direction of the resultant force Fr of the braking force Fxrmax and the lateral force Fy is normal to a straight line connecting the gravity center O of the vehicle and a road contact point P of the rear wheel on a top plan view of the vehicle and so that the magnitude of the resultant force Fr is equal to the radius of the friction circle of the rear wheel. Therefore, letting B be the distance between the gravity center O and the axis of rotation of the rear wheel, $\mu r$ be a coefficient of friction between the rear wheel and the road surface, and Wr be the load on the rear wheel, Fxrmax can be represented by Eq. (4) below.

$$Fxr\max = \mu r \times Wr \times \frac{t}{\sqrt{4 \times B^2 + t^2}} \qquad (4)$$

The braking force is distributed to the front and rear wheels in accordance with a ratio of the Fxfmax and Fxrmax.

In the behavior control of the understeer tendency, the braking force is distributed proportionate to the radii of the friction circles of the front and rear wheels.

An embodiment of the present invention will be described with reference to the accompanying drawings.

Figure 6:
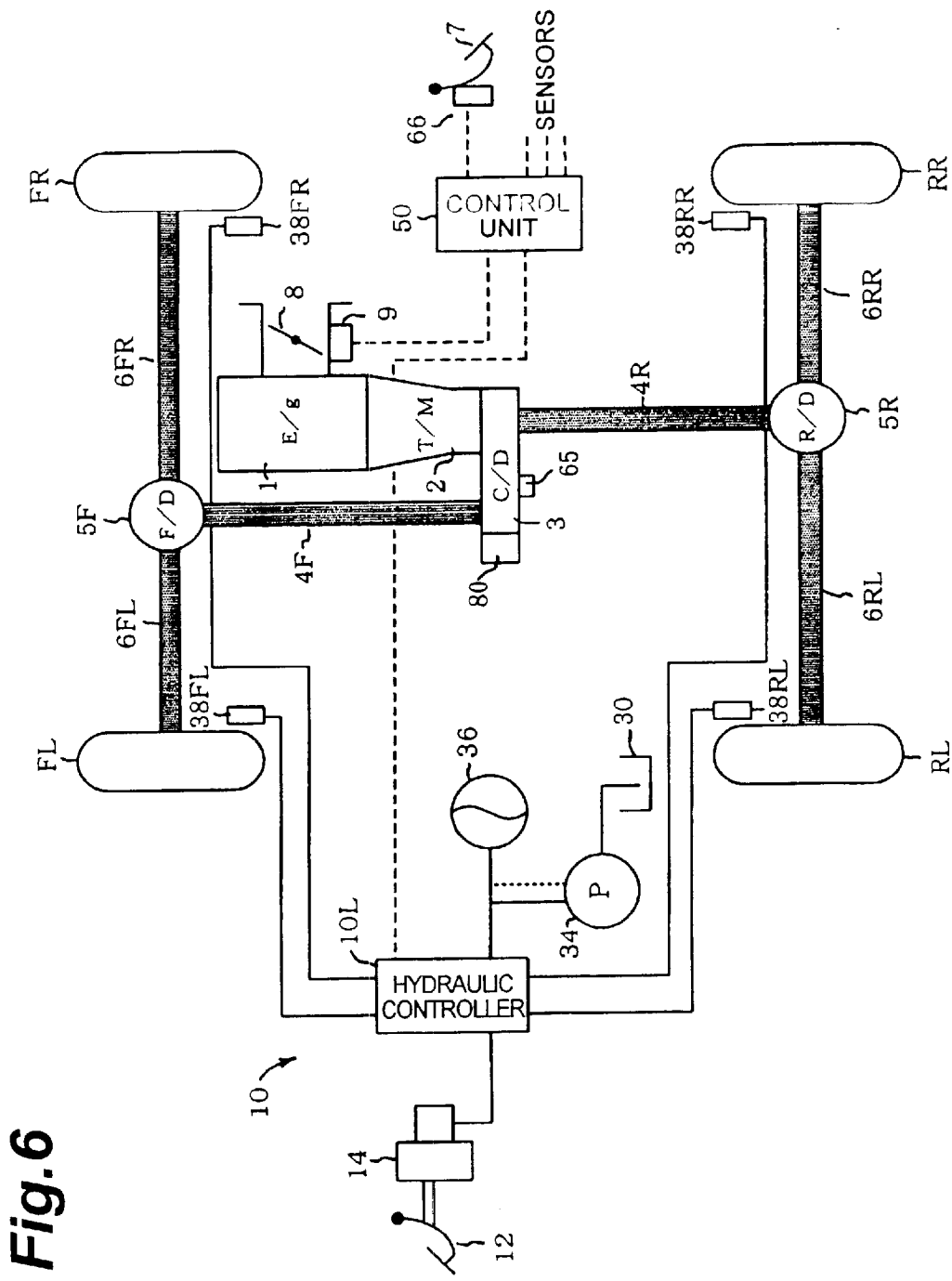
FIG. 6 is a schematic structural diagram of a vehicle-behavior control apparatus according to the present invention.

FIG. 6 schematically shows the structure of a four-wheel-drive vehicle according to the embodiment. The rotational output of engine 1 is transmitted through a transmission 2 and is further distributed through a center differential 3 to a front-wheel drive shaft 4F and to a rear-wheel drive shaft 4R. This center differential 3 is provided with a lock mechanism to limit the differential function, and thus the differential is structured to be locked or unlocked by actuation of a differential-lock actuator 80 in response to driver's manipulation. The center differential 3 is provided with a differential-lock detecting sensor 65 for detecting a lock state (differential limited state) of the center differential 3.

The front-wheel drive shaft 4F is coupled through a front differential 5F to left and right drive axles 6FL, 6FR, and the rear-wheel drive shaft 4R is coupled through a rear differential 5R to left and right drive axles 6RL, 6RR. The driving force of engine 1 is thus distributed through the differential 5F or 5R to each of the wheels FL, FR, RL, RR.

The braking force at each wheel FL, FR, RL, or RR is controlled by adjusting braking pressure at each wheel cylinder 38FL, 38FR, 38RL, or 38RR by a hydraulic controller 10L of the braking system 10.

Figure 7:
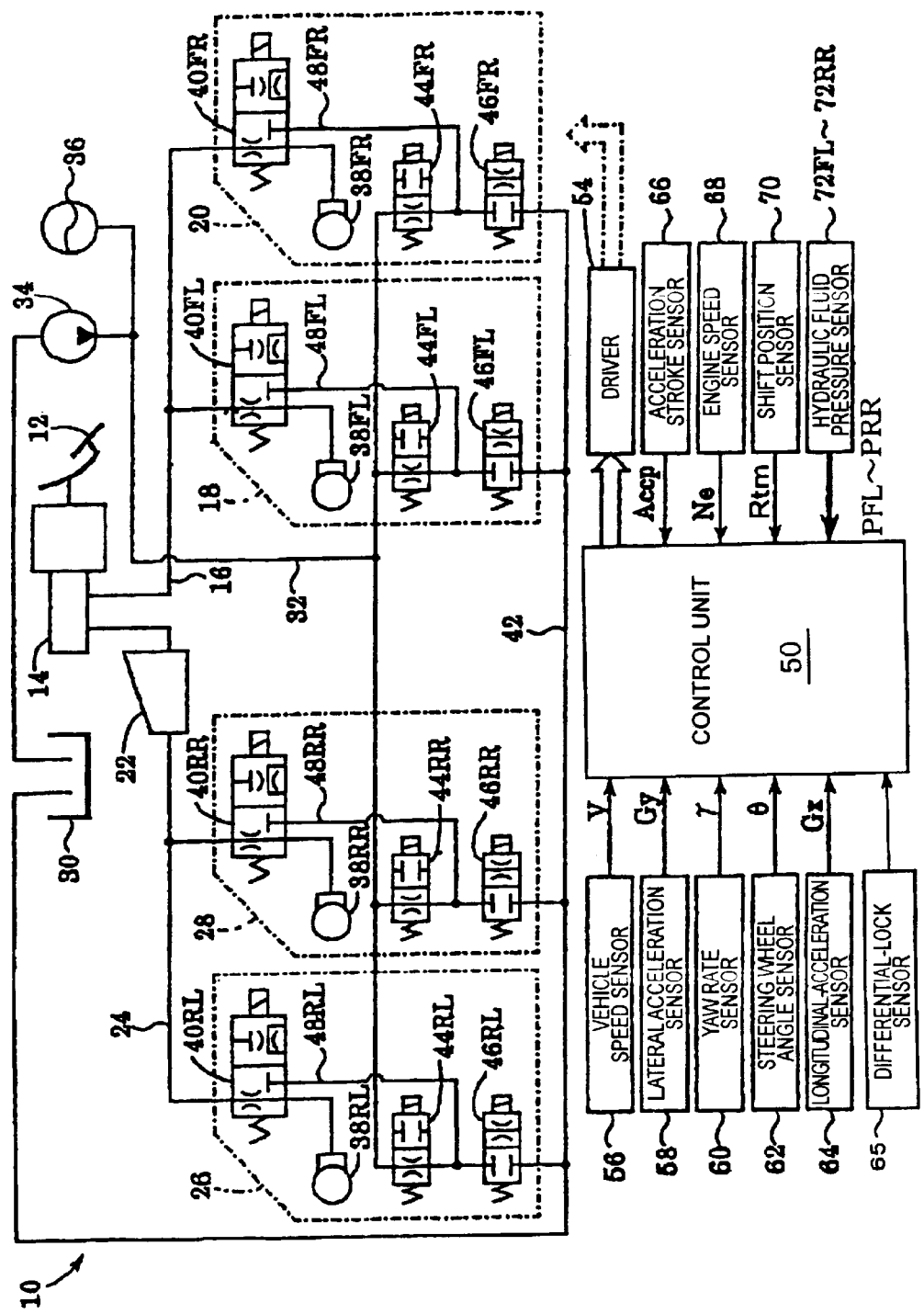
FIG. 7 is a schematic structural diagram of a brake system of the vehicle.

FIG. 7 shows the structure of the braking system 10. The braking system 10 has a master cylinder 14 for delivering the brake oil through first and second ports in response to driver's brake-pedal actuation, and the first port is connected to brake pressure control unit 50s 18 and 20 for the-front left and right wheels by a brake pressure control tube 16 for the front wheels. The second port is connected to brake pressure control unit 50s 26 and 28 for the rear left and right wheels by a brake pressure control tube 24 for the rear wheels equipped with a proportional valve 22 midway. The braking system 10 also has an oil pump 34 to pump up the brake oil reserved in a reservoir 30 and supply the high-pressure oil through a high-pressure tube 32. The high-pressure tube 32 is connected to each of the brake pressure control units 18, 20, 26, 28 and an accumulator 36 is connected to a midpoint of the tube.

Each brake pressure control unit 18, 20, 26, or 28 has a wheel cylinder 38FL, 38FR, 38RL, or 38RR for controlling the braking force at a corresponding wheel, a solenoid-operated control valve 40FL, 40FR, 40RL, or 40RR of a 3-port 2-position switching type, a normally opened, solenoid-operated open/close valve 44FL, 44FR, 44RL, or 44RR provided between a low-pressure tube 42 connected to the reservoir 30, and the high-pressure tube 32, and a normally closed, solenoid-operated open/close valve 46FL, 46FR, 46RL, or 46RR. The high-pressure tube 32 between the valve 44FL, 44FR, 44RL, or 44RR and the valve 46FL, 46FR, 46RL, 46RR in each unit is connected to the control valve 40FL, 40FR, 40RL, or 40RR by a connection tube 48FL, 48FR, 48RL, or 48RR.

Each control valve 40FL or 40FR is arranged to switch between a first position in the figure to establish communication between the brake pressure control tube 16 for the front wheels and the wheel cylinder 38FL or 38FR and cut off communication between the wheel cylinder 38FL or 38FR and the connection tube 48FL or 48FR and a second position to cut off the communication between the brake pressure control tube 16 and the wheel cylinder 38FL or 38FR and establish the communication between the wheel cylinder 38FL or 38FR and the connection tube 48FL or 48FR. Similarly, each control valve 40RL or 40RR is arranged to switch between a first position in the figure to establish communication between the brake pressure control tube 24 for the rear wheels and the wheel cylinder 38RL or 38RR and cut off communication between the wheel cylinder 38RL or 38RR and the connection tube 48RL or 48RR and a second position to cut off the communication between the brake pressure control tube 24 and the wheel cylinder 38RL or 38RR and establish the communication between the wheel cylinder 38RL or 38RR and the connection tube 48RL or 48RR.

When the open/close valve 44FL, 44FR, 44RL, 44RR and the open/close valve 46FL, 46FR, 46RL, 46RR are controlled in the illustrated state with the control valve 40FL, 40FR, 40RL, 40RR at the second position, the wheel cylinder 38FL, 38FR, 38RL, 38RR is in communication with the high-pressure tube 32 through the control valve 40FL, 40FR, 40RL, 40RR and the connection tube 48FL, 48FR, 48RL, 48RR, thereby increasing the pressure inside the wheel cylinder 38FL, 38FR, 38RL, 38RR. Conversely, when the open/close valve 44FL, 44FR, 44RL, 44RR is closed and the open/close valve 46FL, 46FR, 46RL, 46RR is opened with the control valve 40FL, 40FR, 40RL, 40RR at the second position, the wheel cylinder 38FL, 38FR, 38RL, 38RR is in communication with the low-pressure tube 42 through the control valve 40FL, 40FR, 40RL, 40RR and the connection tube 48FL, 48FR, 48RL, 48RR, thereby decreasing the pressure inside the wheel cylinder 38FL, 38FR, 38RL, 38RR. When the open/close valve 44FL, 44FR, 44RL, 44RR and the open/close valve 46FL, 46FR, 46RL, 46RR both are closed with the control valve 40FL, 40FR, 40RL, 40RR at the second position, the wheel cylinder 38FL, 38FR, 38RL, 38RR is interrupted from both the high-pressure tube 32 and the low-pressure tube 42, thereby maintaining the pressure inside the wheel cylinder 38FL, 38FR, 38RL, 38RR as it is.

As constructed in the above structure, the braking system 10 is able to generate the braking force according to the stroke of the brake pedal 12 actuated by the driver by means of the wheel cylinders 38FL, 38FR, 38RL, 38RR when the control valves 40FL, 40FR, 40RL, 40RR are at their first position, and to control the braking force at either one of the wheels, regardless of the stroke of the brake pedal 12 and the braking force at the other wheels, by the open/close control of the open/close valve 44FL, 44FR, 44RL, 44RR and the open/close valve 46FL, 46FR, 46RL, 46RR of the associated wheel when either of the control valves 40FL, 40FR, 40RL, 40RR is at its second position.

On the other hand, a control unit 50 receives detection results from a vehicle speed sensor 56 for detecting the vehicle speed V, a lateral acceleration sensor 58 for detecting the lateral acceleration Gy acting to the body, a yaw rate sensor 60 for detecting the yaw rate γ acting to the body, a steering wheel angle sensor 62 for detecting the steering wheel angle θ, a longitudinal acceleration sensor 64 for detecting the longitudinal acceleration Gx acting to the body, the differential-lock detecting sensor 65 for detecting the lock state of the center differential 3, an acceleration stroke sensor 66 for detecting the stroke Accp of the accelerator pedal 7, an engine speed sensor 68 for detecting the engine speed Ne, a shift position sensor 70 for detecting the shift position (a gear ratio Rtm) of the transmission 2, and hydraulic fluid pressure sensors (pressure sensors) 72FL, 72FR, 72RL, 72RR for detecting the oil pressure (brake pressure) inside the wheel cylinders 38FL, 38FR, 38RL, 38RR. The control unit 50 carries out control operations including control of the operation of the braking system 10, control of driving of a throttle motor 9 for changing the travel of a throttle valve 8, control of output power of the engine 1, etc., based on these detection results. The lateral acceleration sensor 58 and other sensors are arranged to detect the lateral acceleration and other factors the positive direction of which is defined along the left turning direction of the vehicle.

Figure 8:
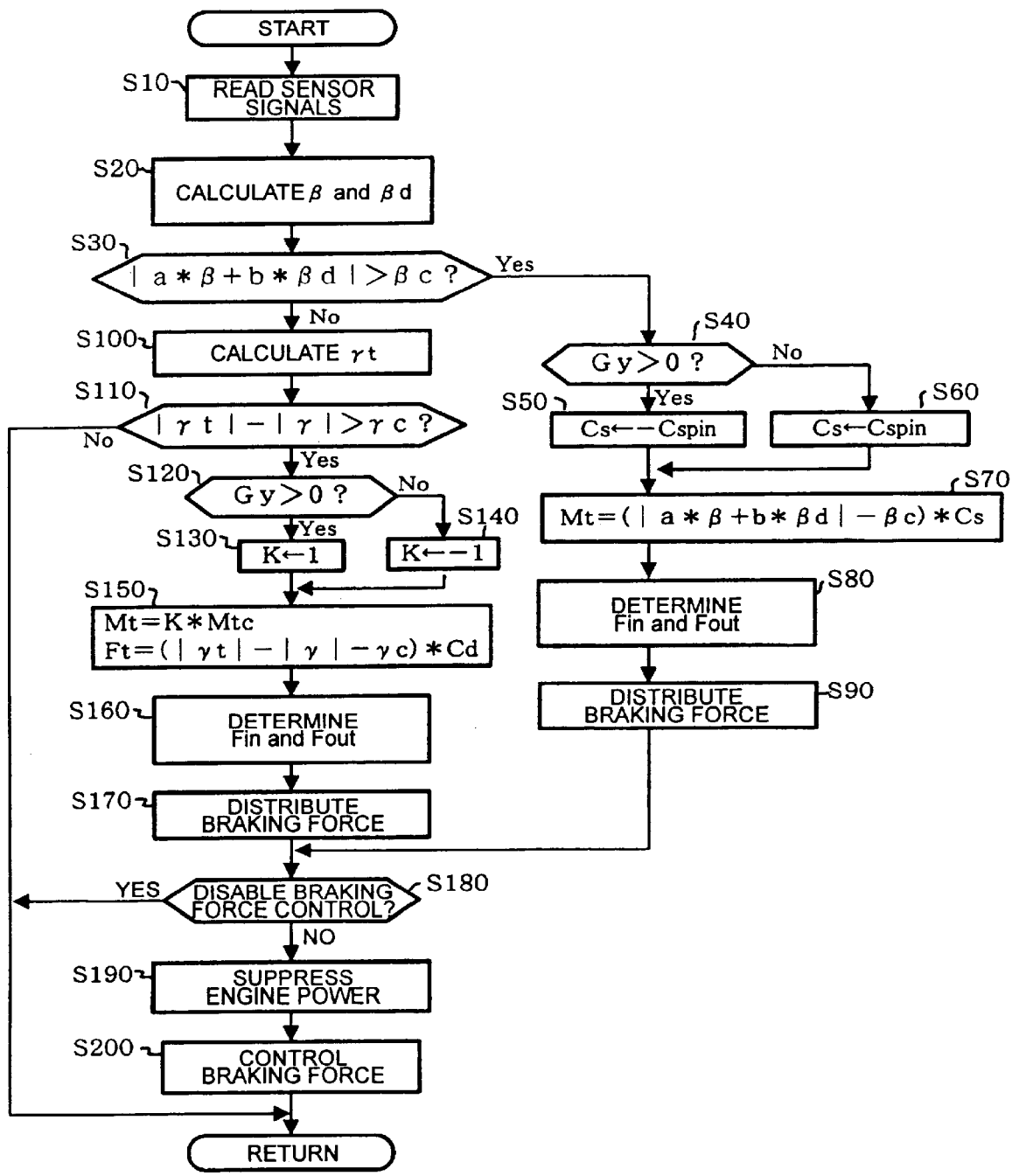
FIG. 8 is a flowchart of behavior control in the apparatus of FIG. 6.

Now, the turning behavior control of the vehicle carried out by the control unit 50 will be explained along the flowchart of FIG. 8. The flowchart illustrated in FIG. 8 is started with on of the ignition switch and is carried out repeatedly at predetermined time intervals.

First, the control unit 50 reads sensor signals which represent the detection results of the various sensors including the vehicle speed sensor 56 etc. in step (which will be represented by "S") 10.

In next S20, the control unit 50 calculates deviation of lateral acceleration (side slip acceleration of the vehicle) Vyd as a difference, Gy−V×γ, between the product V×γ of the vehicle speed V and the yaw rate y, and the lateral acceleration Gy, calculates side slip velocity Vy of the vehicle by integrating the deviation Vyd of lateral acceleration, and calculates a slip angle β of the vehicle as a ratio Vy/Vx of the side slip velocity Vy of the vehicle to the longitudinal velocity Vx (=vehicle speed V) of the vehicle. The control unit 50 also calculates body slip angular velocity βd as a differential of the slip angle β of the body.

In next S30, the control unit 50 evaluates whether an absolute value of a linear combination a×β+b×βd of the body slip angle β and slip angular velocity βd, where a and b are positive constants, is over a reference value βc (a positive constant), i.e., whether the vehicle is going into the spin tendency.

If the control unit evaluates "Yes" in S30, i.e., when the vehicle is judged as going into the spin tendency, then the control unit 50 advances to S40 to evaluate whether the lateral acceleration Gy is positive, i.e., whether the vehicle is in the turning left state. When the vehicle is in the turning left state, the control unit 50 goes to S50 to set a coefficient Cs in Eq. (5) below to −Cspin, where Cspin is a positive constant. When the vehicle is in the turning right state, the control unit 50 goes to S60 to set the coefficient Cs to Cspin.

In next S70, the control unit 50 calculates the target yaw moment Mt according to Eq. (5) below and sets the target longitudinal force Ft to Ftc (constant).

$$Mt = (|a \times \beta + b \times \beta d| - \beta c) \times Cs \tag{5}$$

In next S80, the control unit 50 calculates the radii Finmax and Foutmax of the friction circles of the inside and outside wheels according to Eq. (1) and Eq. (2) stated previously, thereby determining the points P2 to P5 of the map illustrated in FIG. 4. The control unit 50 also calculates the output torque Te of the engine 1 from a predetermined map preliminarily prepared, based on the stroke Accp of the accelerator pedal 7 and the engine speed Ne. Then the control unit 50 calculates tractions Fdin and Fdout acting on the inside and outside wheels from a predetermined map, based on the gear ratio Rtm of the transmission 2 and the output torque Te. These calculations yield the points P1', P4', and P6'. The braking force Fout for the outside wheels is determined by the aforementioned technique, based on the map of FIG. 4 determined in this way.

Figure 9:
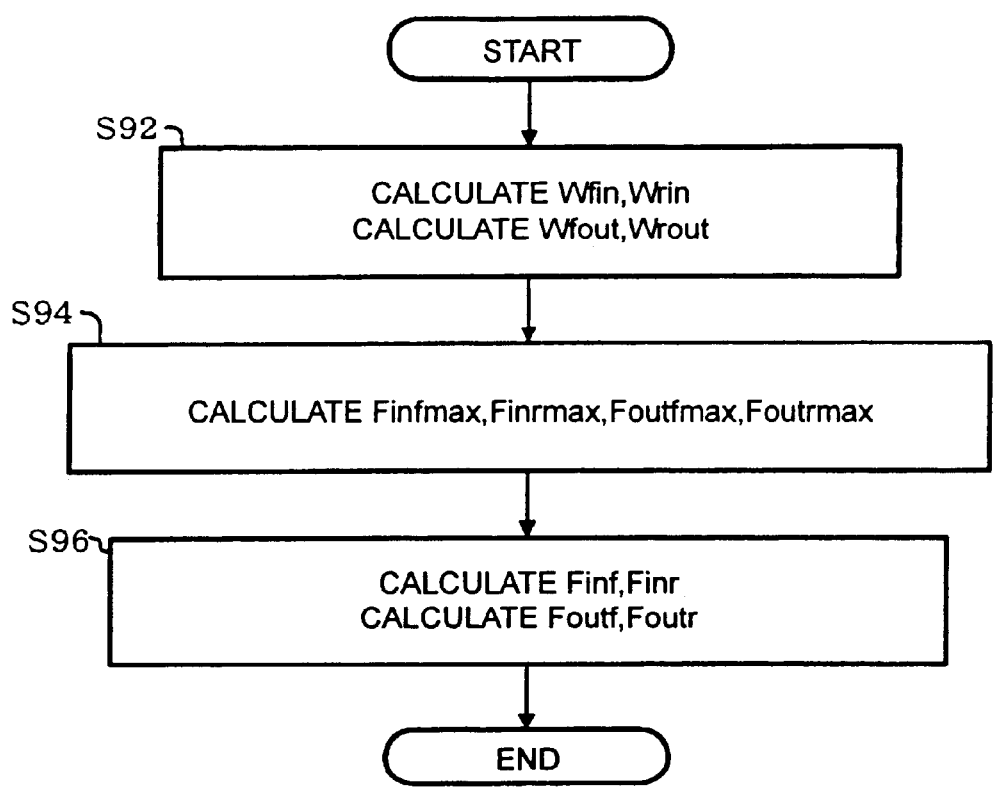
FIG. 9 to FIG. 14 are flowcharts to show part of the flowchart of FIG. 8 or modifications of part of the flowchart of FIG. 8.

In next S90, the braking force Fout for the outside wheels is distributed to the front and rear wheels in accordance with the flowchart illustrated in FIG. 9, thereby computing the target braking forces at the front and rear outside wheels.

In S92, the control unit 50 first calculates the load Wfin and Wrin acting on the front and rear inside wheels, respectively, according to Eq. (6) and Eq. (7) below based on the longitudinal acceleration Gx and the lateral acceleration Gy, where mf and mr are a mass on the front or rear wheel side of the vehicle and Cfr is a rate of roll stiffness distribution of the front wheels. The control unit 50 also calculates the load Wfout and Wrout acting on the front and rear outside wheels, respectively, according to Eq. (8) and Eq. (9) below based on the longitudinal acceleration Gx and the lateral acceleration Gy.

$$Wfin = mf \times \frac{g}{2} - m \times Gx \times h - Cfr \times m \times Gy \times \frac{h}{t} \tag{6}$$

$$Wrin = mr \times \frac{g}{2} + m \times Gx \times h - (1-Cfr) \times m \times Gy \times \frac{h}{t} \tag{7}$$

$$Wfout = mf \times \frac{g}{2} - m \times Gx \times h + Cfr \times m \times Gy \times \frac{h}{t} \tag{8}$$

$$Wrout = mr \times \frac{g}{2} + m \times Gx \times h + (1-Cfr) \times m \times Gy \times \frac{h}{t} \tag{9}$$

In next S94, the maximum braking forces Finfmax and Finrmax those can be produced at the front and rear inside wheel, respectively, are calculated according to Eq. (10) and Eq. (11) corresponding to aforementioned Eq. (3) and Eq. (4), where μinf and μinr are coefficients of friction at the front and rear inside wheels, respectively, against the road surface. The control unit 50 also calculates the maximum braking forces Foutfmax and Foutrmax those can be produced at the front and rear outside wheels, respectively, according to Eq. (12) and Eq. (13) corresponding to aforementioned Eq. (3) and Eq. (4), where μoutf and μoutr are coefficients of friction at the front and rear outside wheels, respectively, against the road surface.

$$Finfmax = \mu inf \times Wfin \tag{10}$$

$$Finrmax = \mu inr \times Wrin \tag{11}$$

$$Foutfmax = \mu outf \times Wfout \tag{12}$$

$$Foutrmax = \mu outr \times Wrout \times \frac{t}{\sqrt{4 \times B^2 + t^2}} \tag{13}$$

In next S96, the braking force Fin for the inside wheels is distributed proportionate to the maximum braking forces Finfmax and Finrmax according to Eq. (14) and Eq. (15) below, thereby calculating the target braking forces Finf and Finr for the front and rear inside wheels. The braking force Fout for the outside wheels is also distributed proportionate to the maximums braking forces Foutfmax and Foutrmax according to Eq. (16) and Eq. (17) below, thereby calculating the target braking forces Foutf and Foutr for the front and rear outside wheels. Then the process indicated by S90 is terminated.

$$Finf = Fin \times \frac{Finfmax}{(Finfmax + Finrmax)} \tag{14}$$

$$Finr = Fin \times \frac{Finrmax}{(Finfmax + Finrmax)} \tag{15}$$

$$Foutf = Fout \times \frac{Foutfmax}{(Foutfmax + Foutrmax)} \tag{16}$$

$$Foutf = Fout \times \frac{Foutrmax}{(Foutfmax + Foutrmax)} \tag{17}$$

Returning to the flowchart of FIG. 8, if the control unit 50 evaluates "No" in S30, i.e., when it is not evaluated that the vehicle is in the spin tendency, then the control unit 50 goes to S100 to calculate a reference yaw rate γc according to Eq. (18) below, where Kh is a stability factor and L is the wheel base. The control unit 50 also calculates a target yaw rate γt according to Eq. (19) below, where T is a time constant and s is the Laplacian.

$$\gamma c = V \times \theta \times (1 + Kh \times V^2) \times L \tag{18}$$

$$\gamma t = \frac{\gamma c}{1 + T \times s} \quad (19)$$

In next S110, the control unit 50 evaluates whether a difference, |γt|−|γ|, between an absolute value of the target yaw rate γt and an absolute value of an actual yaw rate γ of the vehicle is over the reference value γc (positive constant), i.e., whether the vehicle is going into the drift-out tendency.

If the control unit 50 evaluates "Yes" in S110, i.e., when the vehicle is judged as going into the drift-out tendency, the control unit 50 goes to S120 to evaluate whether the lateral acceleration Gy is positive, i.e., whether the vehicle is in the turning left state. If the control unit 50 evaluates "Yes" in S120, the control unit 50 goes to S130 to set the value of coefficient K to 1. If the control unit 50 evaluates "No" in S120, the control unit 50 advances to S140 to set the value of coefficient K to −1.

The control unit 50 advances via S130 or S140 to S150 to set a target yaw moment Mt to K×Mtc where Mtc is a constant, and also calculates a target longitudinal force Ft according to Eq. (20) below.

$$Ft = (|\gamma t| - |\gamma| - \gamma c) \times Cd \quad (20)$$

In next S160, the control unit 50 calculates the radii Finmax and Foutmax of the friction circles of the inside and outside wheels according to aforementioned Eq. (1) and Eq. (2), determines the points P2' to P6' in the map of FIG. 3, based on the values of ⅓ of these radii of the friction circles, and determines the braking forces Fin and Fout for the inside and outside wheels by the aforementioned technique, based on the map of FIG. 3 determined in this way.

In next S170, the control unit 50 distributes the braking force Fin for the inside wheels and the braking force Fout for the outside wheels to the front and rear wheels in much the same fashion as in S90, thereby calculating the target braking forces at the respective wheels. The maximum braking force Finrmax that can be produced at the rear inside wheel is calculaed according to Eq. (21) below substituting for Eq. (13) in S94 in the flowchart of FIG. 9.

$$Finrmax = \mu inr \times Wrin \quad (21)$$

In next S180, the control unit 50 determines whether or not disable the braking force control in consideration of the lock state of the center differential 3. How to determine whether or not disable the braking force control will be detailed after.

If the control unit 50 determines in S180 that the braking force control should be disabled, the control unit 50 skips the processes of suppressing engine power (S190) and controlling braking force (S200) to terminate this routine and returns S10 to repeat the processing.

On the other hand, if the control unit 50 determines to disable the braking force control in S180 then the control unit 50 advances to S190 to carry out the engine power suppressing process to lower the engine output power. Specifically, this process is to lower the engine output power by automatically reducing the opening angle of the throttle valve 8 according to a vehicle state amount captured in S30 or S110, for example. Normally, the opening angle of the throttle valve 8 is determined according to the stroke Accp of the accelerator pedal 7 detected by the accelerator stroke sensor 66, but during execution of the behavior control to stabilize the turning behavior by the braking system 10 as described previously, the throttle motor 9 is actuated, independent of the stroke Accp of the accelerator pedal 7, under control of the control unit 50, whereby the throttle valve 8 is displaced down to a predetermined opening angle closer to the closed end.

A map is preliminarily made to define throttle-valve opening angles according to various vehicle state amounts including the spin tendency, the driftout tendency, etc., and a throttle-valve opening angle is determined in S190 by searching the map, based on the vehicle state amount captured. The throttle motor 9 is then actuated according to the throttle-valve opening angle thus determined.

In next S200, the control unit 50 calculates a target brake pressure of the wheel cylinder 38*i* (i=FL, FR, RL, RR) of each wheel, based on the target braking force at each wheel calculated in S90 or in S170, and also calculates a duty ratio Dir according to Eq. (22) below. In Eq. (22) below, Kp and Kd are gain coefficients of the proportional and differential in the feedback control of the control pressure, Pi is the pressure in the wheel cylinder at each wheel, and Pti is the target wheel-cylinder pressure at each wheel.

$$Dir = Kp \times (Pi - Pti) + Kd \times \frac{d(Pi - Pti)}{dt} \quad (22)$$

In S200 a control signal is outputted from the control unit 50 to the control valve 40*i* of the wheel the braking pressure of which is to be increased or decreased, whereby the control valve is switched to the second position in response thereto. A control signal corresponding to the duty ratio Dir is also outputted to the open/close valves of the outside wheel of that wheel, thereby controlling the supply/stop of the accumulator pressure to the wheel cylinder 38*i*. This increases or decreases the braking pressure, thereby controlling the braking force to the target braking force at each wheel.

In this case, when the duty ratio Dir is a value between a negative reference value and a positive reference value, the upstream open/close valve is switched to the second position and the downstream open/close valve is held at the first position, thereby maintaining the pressure in the corresponding wheel cylinder. When the duty ratio Dir is not less than the positive reference value, the upstream and downstream open/close valves of the outside wheel are controlled to the positions illustrated in FIG. 7, to supply the accumulator pressure to the corresponding wheel cylinder, thereby increasing the pressure in this wheel cylinder. When the duty ratio Dir is not more than the negative reference value, the upstream and downstream open/close valves of the outside wheel are switched to the second position, to discharge the brake oil in the corresponding wheel cylinder to through the low-pressure tube 42, thereby decreasing the pressure in this wheel cylinder.

Now, let us describe how to determine whether or not disable the braking force control in S180 in consideration of the lock state of the center differential 3.

Figure 10:
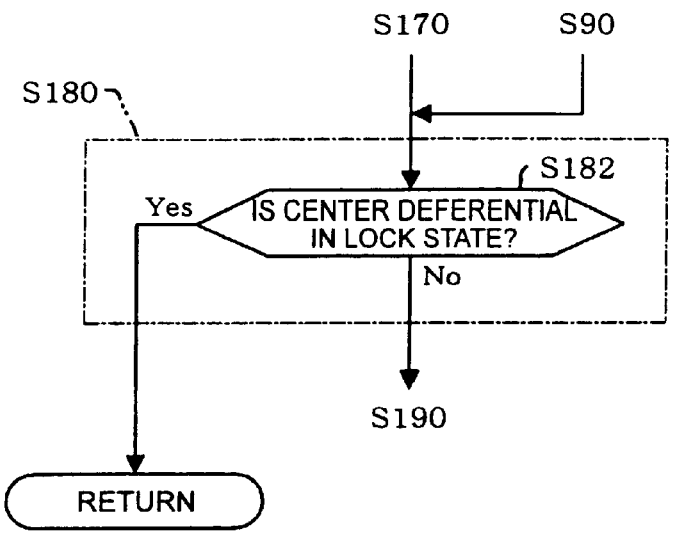

FIG. 10 shows an example of the process in S180. The control unit 50 advances via S90 or S170 to S182 to evaluate whether the center differential 3 is in the lock state, based on the result of detection of the differential-lock detecting sensor 65. If the center differential 3 is free (in the unlock state) (evaluated "No" in S182) then the control unit 50 goes to S190 and the step thereafter to execute the aforementioned suppressing engine power process (S190) and the controlling braking force at each wheel process (S200). Contrarily, if the center differential 3 is in the lock state (evaluated "Yes" in S182) then the control unit 50 terminates this routine skips these processes (S190 and S200) and terminates this routine.

In the lock state of the center differential 3 the braking force and/or traction can act at an unintended wheel because of the restraint on the difference between rotational speeds of the front wheels FL, FR and the rear wheels RL, RR, so as to vary the magnitude of the antispin moment and/or the front-rear wheel balance between lateral forces acting wheels, when compared with those in the free state of the center differential 3. Thus the braking force control at each wheel and the suppressing engine power are disabled in the lock state of the center differential 3, thereby preventing degradation of driveability and execution of control deviating from driver's expectation. Although omitted from the flowchart, it is desirable on the occasion of inhibition of the braking force control etc. to call a driver's attention to drive with more care by informing the driver of this disable processing with illumination of the indicator lamp or the like.

Figure 11:
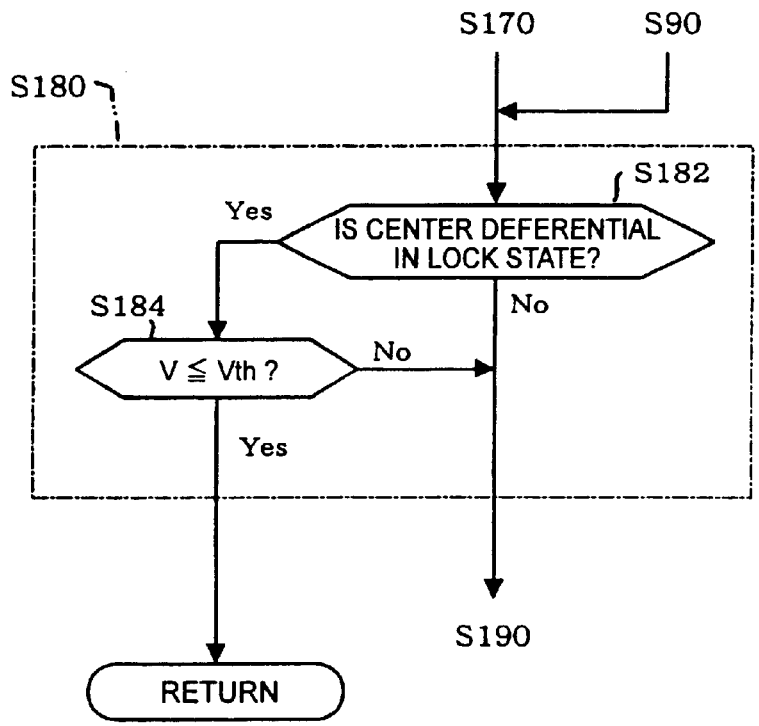

Another embodiment of such a disable processing is illustrated in FIG. 11. Whether the center differential 3 is in the lock state is evaluated in S182, as in FIG. 10. If the center differential 3 is free then the control unit 50 goes to the processes of S190 and thereafter similarly. In contrast, if the center differential 3 is in the lock state then the control unit 50 goes to S184 to evaluate further whether the vehicle speed V is in a low speed range, i.e., not more than a predetermined threshold Vth. If the vehicle speed V is in the low speed range (evaluated "Yes" in S184), the control unit 50 skips the engine power suppressing process (S190) and the braking force controlling porcess (S200) so as to terminate this routine. If the vehicle speed V is in a high speed range (evaluated "No" in S184), the control unit 50 goes to the aforementioned processes of S190 and thereafter to execute these processes (S190 and S200).

This is for the purpose of stabilizing the vehicle behavior by preferentially carrying out the engine power suppressing process (S190) and the braking force controlling process (S200) during running in the high vehicle speed range, taking it into consideration that the stability of the vehicle becomes lower with increase in the vehicle speed V. During running in the low speed range, the braking force control (S200) etc. are disabled as described above, thereby preventing the degradation of driveability which could occur when the braking force control (S200) is carried out under the locked condition of the center differential 3.

Figure 12:
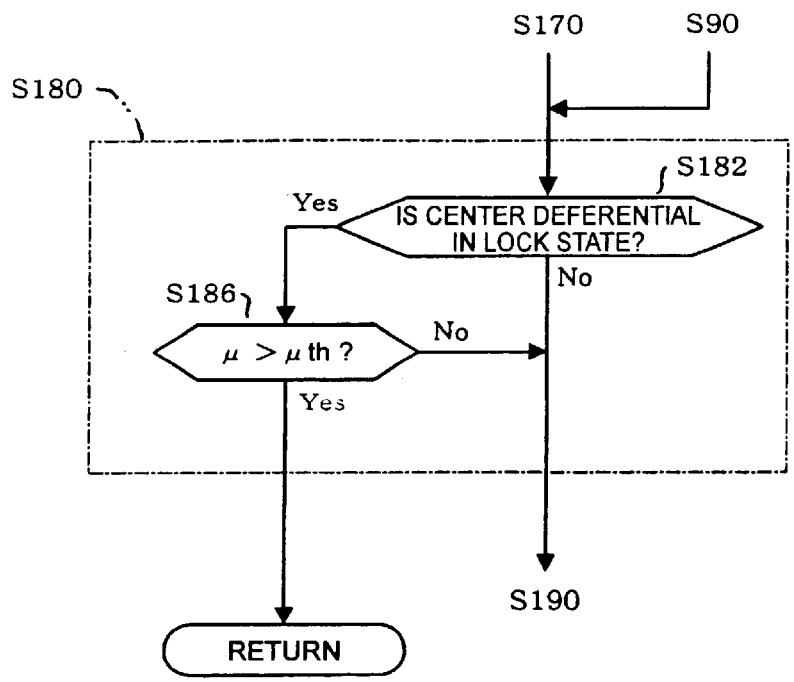

As still another example of such an inhibition determining process, as illustrated in FIG. 12, when the center differential 3 is in the lock state (evaluated "Yes" in S182), the control unit 50 advances to S186 to evaluate whether the friction coefficient $\mu$ against the road surface to indicate the friction condition of the road surface is greater than a predetermined reference value $\mu$th. In the lock state of the center differential 3, braking force at the front outside wheel acts to the rear wheels or traction acts to the front inside wheel. If the friction is great on the road surface then reduction in the vertical load becomes larger, especially, at the inside wheels because of the weight shift caused by the centrifugal force. This can result in increasing slip amounts. For this reason, if evaluated "Yes" in s186, i.e., if the friction coefficient $\mu$ against the road surface is greater than the reference value $\mu$th, then the control unit 50 disables the braking force control at each wheel and the suppressing engine power, thereby preventing the increase in slip amounts.

A technique to estimate the friction coefficient $\mu$ against the road surface can be one selected, for example, from a technique of searching an empirically obtained map for the friction coefficient $\mu$ against the road surface, based on the steering-wheel angle $\theta$ and the lateral acceleration Gy, a technique of estimating the friction coefficient, based on slip rates of the wheels under acceleration or under braking, a technique of estimating the friction coefficient, based on deviation of the lateral acceleration derived from the steering-wheel angle $\theta$ and the vehicle speed V, from the lateral acceleration Gy detected by the lateral acceleration sensor 58, and so on, without having to be limited to specific methods.

Figure 13:
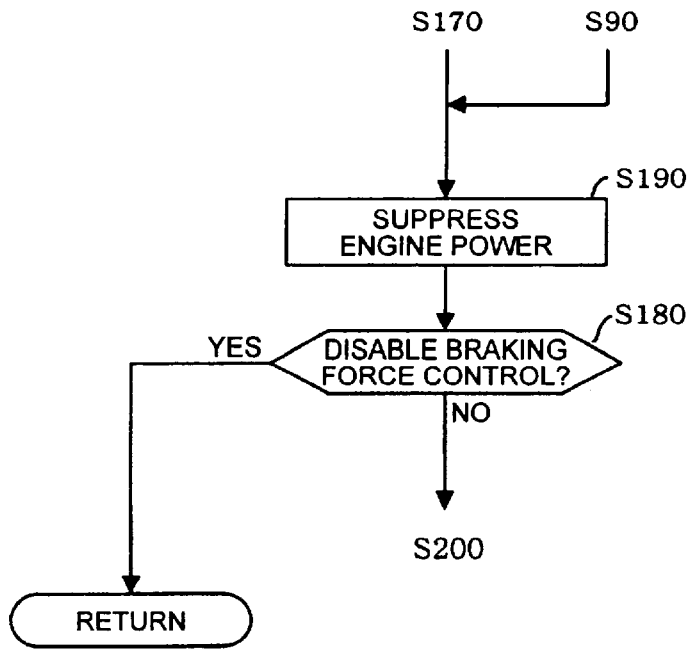

As another example, as illustrated in FIG. 13, the flowchart may also be modified to flow via S90 or S170 to S190 to carry out the suppressing process of engine power (S190) and thereafter advances to S180 to carry out the evaluating process. When the braking force control is judged to be disabled after execution of the evaluating process as exemplified in FIG. 10 to FIG. 12, only the braking force control at each wheel (S200) is disabled, while the suppressing process of engine power (S190) is executed accordingly. Namely, when the vehicle behavior is judged as being the spin tendency or the drift-out tendency and when the control step reaches S90 or S170, the suppressing process of engine power (S190) is always carried out to decrease the vehicle speed V, thereby shifting the vehicle state toward assurance of running stability.

The embodiments illustrated in FIG. 10 to FIG. 13 showed the examples wherein the braking control at each wheel (S200) was disableed in the lock state of the center differential 3, but another possible example is to carry out the braking force control at each wheel to stabilize the vehicle behavior, based on correction for braking forces of the respective wheels set in the free state of the center differential 3 in consideration of locking status of the center differential 3.

Figure 14:
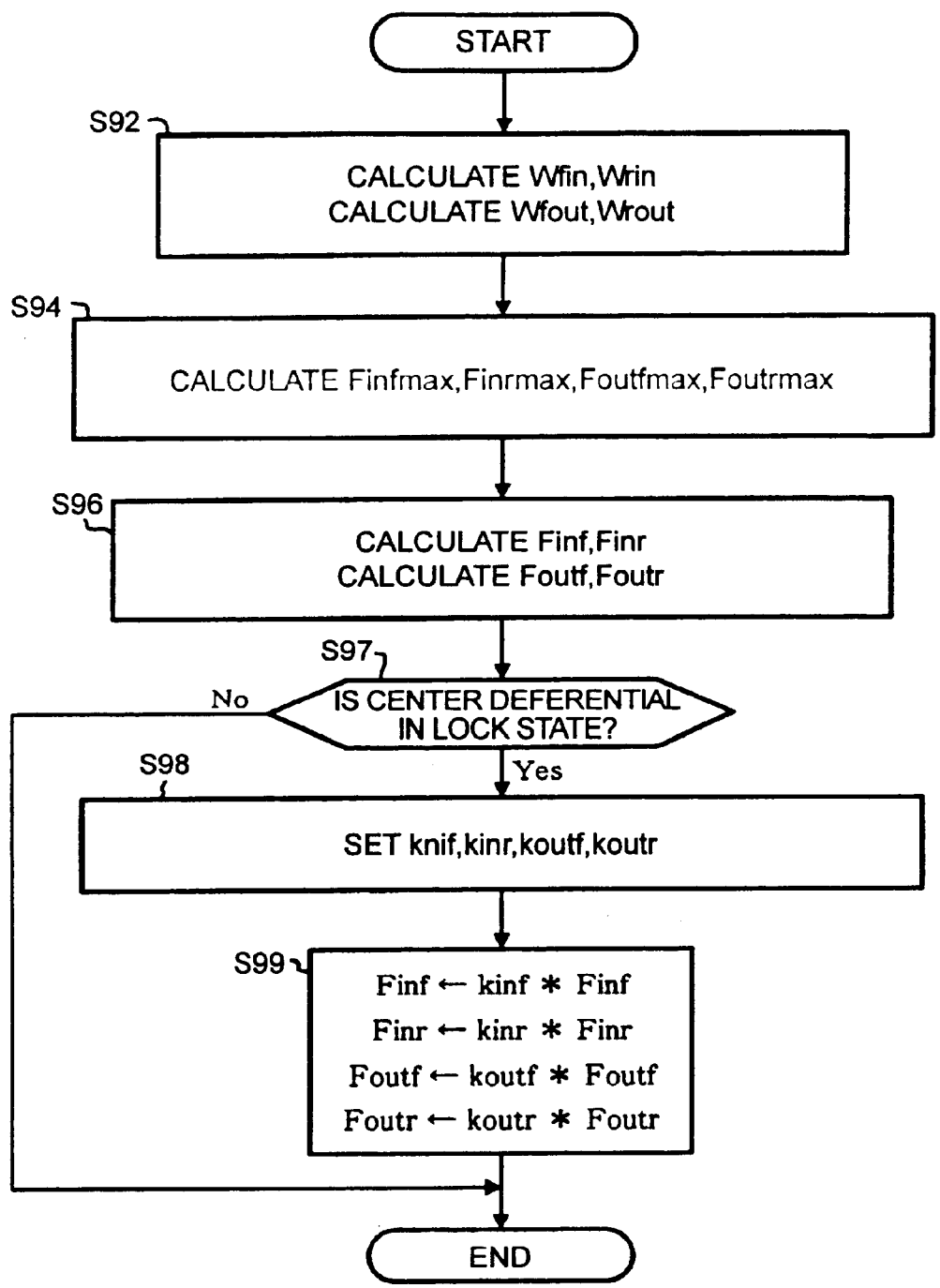

Such a correction process of braking forces upon locking of the center differential 3 will be described with an example wherein it is carried out in S90 described previously. As illustrated in FIG. 14, after carrying out S92 to S96 as described referring to FIG. 9, the control unit 50 goes to S97. In S97, the control unit 50 evaluates whether the center differential 3 is in the lock state, based on the result of detection of the differential-lock detecting sensor 65. If the center differential 3 is free (evaluated "No" in S97), the control unit 50 sets the target braking forces Finf and Finr for the front and rear inside wheel and the target braking forces Foutf and Foutr for the front and rear outside wheel, calculated in S96, without correction, as in the case of the flowchart of FIG. 9.

If the center differential 3 is in the lock state (evaluated "Yes" in S97), the control unit 50 goes to S98 to set correction coefficients kinf, kinr, koutf, koutr corresponding to the respective wheels in accordance with the vehicle state amount as a spin state amount obtained in S30 or the like. The correction coefficient kinf, kinr, koutf, and koutr are correction coefficients for the braking force set for the front inside wheel, the rear inside wheel, the front outside wheel, and the rear outside wheel, respectively. For example, the correction coefficients for the respective wheels are preliminarily obtained according to various spin state amounts (a×$\beta$+b×$\beta$d) by experiments, a map is formed based thereon, and the map is searched based on the spin state amount obtained in S30, thereby setting the correction coefficients kinf, kinr, koutf, and koutr corresponding to the respective wheels.

In next S99, each of the target braking forces Finf, Finr, Foutf, and Foutr calculated in S96 is multiplied by the correction coefficient kinf, kinr, koutf, or koutr corresponding to each wheel, set in S98, and each of the multiplication results is set as a new target braking force Finf, Finr, Foutf, or Foutr.

With execution of such a correction process, the suitable braking force control according to the spin state can be carried out even in the lock state of the center differential 3, thereby stabilizing the turning behavior with suppressing the spin tendency.

In S98, the correction coefficients kinf, kinr, koutf, koutr corresponding to the respective wheels may set by searching a map to indicate the correction coefficients for the respective wheels preliminarily obtained according to drift-out state amounts (γt–γ) by experiments, based on the drift-out state amount (γt–γ) obtained in S110.

With execution of such a correction process, the suitable braking force control can be carried out according to the drift-out state even in the lock state of the center differential 3, thereby stabilizing the cornering behavior with suppressing the drift-out tendency.

Although in the embodiments described above the differential mechanism allowed to be locked was the center differential 3, it does not have to be limited to the center differential 3. The techniques described in the embodiments can also be applied to the cases wherein any differential mechanism becomes locked, for example, including the case wherein both the center differential 3 and rear differential 5R as differential mechanisms become locked, the case wherein all the center differential 3, rear differential 5R, and front differential 5F as differential mechanisms become locked, and so on.

It is also possible to set the disable braking force control condition or to set the correction coefficients for the braking forces, in consideration of acceleration, deceleration, cornering stiffness, etc. as vehicle states and/or in consideration of unevenness of the road surface, uphill road, downhill road, etc. as road surface conditions.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A vehicle-behavior control apparatus for a vehicle having front wheels and rear wheels with a differential mechanism, comprising:
   brake mechanisms provided for each of the respective front wheels and rear wheels and applying a braking force to a corresponding wheel; and
   a braking force control means for calculating target braking forces for each wheel to be applied by the brake mechanisms in accordance with a turning behavior state of the vehicle, and controlling the brake mechanisms to generate the target braking forces on each front wheel and rear wheel,
   wherein the braking force control means corrects the target braking forces when the differential mechanism is in a differential limited state to block differential action thereof, corrected target braking forces are calculated from the target braking forces on the precondition that the differential mechanism is not in a differential limited state.

2. The vehicle-behavior control apparatus according to claim 1, wherein correction factors used in correction of the target braking forces depend on a turning behavior state of the vehicle.

3. The vehicle-behavior control apparatus according to claim 1, wherein the differential mechanism is a center differential for distributing the driving force to the front wheels and to the rear wheels.

4. The vehicle-behavior control apparatus according to claim 3, wherein the braking force control means applies an excess braking force to a front outside wheel.

5. A vehicle-behavior control apparatus for a vehicle having front wheels and rear wheels with a center differential, comprising:
   a control unit adopted to be connected to a braking system and vehicle status sensors to calculate target braking forces for each front wheel and rear wheel, the braking force to be applied by a braking system in response to a spin or driftout moment determined by any outputs of the vehicle sensors, and to direct the braking system to generate the target breaking forces on each front wheel and rear wheel,
   wherein the control unit corrects the target breaking forces when the center differential is in a differential limited state to block differential action thereof, corrected target breaking forces are calculated from the target breaking forces on a precondition that the center differential is not in a differential limited state.

6. The vehicle-behavior control apparatus according to claim 5, wherein correction factors used in correction of the target breaking forces depend on a turning behavior state of the vehicle.

7. The vehicle-behavior control apparatus according to claim 5, wherein the control unit directs the braking system to apply an excess braking force to a front outside wheel.

8. A vehicle-behavior control method for a vehicle having front wheels, rear wheels, a center differential and a braking system with a braking force distribution control unit, comprising:
   estimating a spin and driftout moment of the vehicle and determining a lock state of the center differential;
   calculating target breaking forces applied to each front wheel and rear wheel by said braking system in response to the spin and driftout moment when the center differential is in a free state;
   correcting each of the target breaking forces based on obtained target breaking forces in the free state of the center differential if the center differential is lock state; and
   controlling braking force distributions so as to generate target breaking forces.

9. The vehicle-behavior control method according to claim 8, wherein an excess braking force to the front outside wheel is applied when the spin or driftout moment exceeds respective threshold values.

* * * * *